(12) United States Patent
Ohnuki et al.

(10) Patent No.: US 8,448,019 B2
(45) Date of Patent: May 21, 2013

(54) PROCESSOR, INFORMATION PROCESSING APPARATUS, AND METHOD OF CONTROLLING PROCESSOR

(75) Inventors: Yoshiteru Ohnuki, Kawasaki (JP); Norihito Gomyo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 325 days.

(21) Appl. No.: 12/971,949

(22) Filed: Dec. 17, 2010

(65) Prior Publication Data
US 2011/0161764 A1   Jun. 30, 2011

(30) Foreign Application Priority Data

Dec. 25, 2009 (JP) ................................. 2009-295447

(51) Int. Cl.
*G06F 11/00* (2006.01)
(52) U.S. Cl.
USPC ............ 714/6.24; 714/746; 714/764; 714/54; 714/49; 714/6.1
(58) Field of Classification Search
None
See application file for complete search history.

(56) References Cited

U.S. PATENT DOCUMENTS

| | | | | |
|---|---|---|---|---|
| 5,412,803 A | * | 5/1995 | Bartow et al. .................. | 709/213 |
| 5,920,579 A | * | 7/1999 | Nagai et al. .................... | 714/764 |
| 6,014,766 A | * | 1/2000 | Nagai et al. .................... | 714/764 |
| 7,669,182 B2 | * | 2/2010 | Garcia .......................... | 717/108 |
| 2003/0154423 A1 | * | 8/2003 | Egolf et al. ..................... | 714/15 |
| 2006/0248434 A1 | | 11/2006 | Radke et al. | |
| 2009/0044050 A1 | * | 2/2009 | Maimone et al. ............... | 714/15 |
| 2009/0287967 A1 | * | 11/2009 | Winokur ........................ | 714/54 |
| 2010/0088572 A1 | | 4/2010 | Ohnuki et al. | |
| 2011/0029809 A1 | * | 2/2011 | Dhuse et al. ..................... | 714/6 |
| 2012/0254658 A1 | * | 10/2012 | Tatsuno ......................... | 714/15 |

FOREIGN PATENT DOCUMENTS

| | | |
|---|---|---|
| JP | 05-020215 | 1/1993 |
| JP | 09-081465 | 3/1997 |
| WO | 2008/152728 | 12/2008 |

OTHER PUBLICATIONS

Extended European Search report issued Jun. 22, 2011 in corresponding EP Patent Application No. 10196439.3.

* cited by examiner

*Primary Examiner* — Christopher McCarthy
(74) *Attorney, Agent, or Firm* — Staas & Halsey LLP

(57) ABSTRACT

A processor includes an accumulator, a storage that outputs data to the accumulator, an error detector that outputs a first error detection signal upon detecting an error in the data, an error identifier that outputs an error identification signal indicating that an error occurs in the storage, an error identification signal holder that outputs the error identification signal as a second error detection signal, an error detection signal holder that holds the first error detection signal and outputs a cancellation signal to stop the accumulation processing of the accumulator, a first calculator that starts making a first calculation based on the second error detection signal and the cancellation signal, and outputs a correction start signal after a lapse of a calculation period, and an error corrector that corrects the error of the data upon receiving the correction start signal.

15 Claims, 12 Drawing Sheets

PROCESSOR, INFORMATION PROCESSING APPARATUS, AND METHOD OF CONTROLLING PROCESSOR

CROSS-REFERENCE TO RELATED APPLICATIONS

This application is based upon and claims priority to prior Japanese Patent Application No. 2009-295447 filed on Dec. 25, 2009 in the Japan Patent Office, the entire contents of which are incorporated herein by reference.

BACKGROUND

1. Field

Embodiments of the present invention relate to a processor, an information processing apparatus, and a method of controlling the processor.

2. Description of the Related Art

"Scalable Processor ARChitecture (SPARC)-V9 (Registered Trademark of SPARC International, Inc.)" has been introduced as one of the architectures of a processor, such as a central processing unit (CPU) provided in an information processing apparatus including a server or the like. According to the SPARC Architecture Version 9, sixty four to five hundred twenty eight 64-bit registers may be implemented as general-purpose registers (GPR).

FIG. 11 exemplarily illustrates a register window 1 used as a general-purpose register file provided in the SPARC Architecture Version 9. In FIG. 11, the register window 1 includes eight in-registers (W0 in to W7 in), eight local registers (W0 local to W7 local), and eight out-registers (W0 out to W7 out), which correspond to eight windows, for example. Of the above-described registers, the in-registers and the out-registers overlap one another, that is, the in-register W0 in and the out-register W7 out overlap each other, the in-register W1 in and the out-register W0 out overlap each other, and so forth as illustrated in FIG. 11. Since the in-registers and the out-registers overlap one another, the performance of a procedure call made to call process including a group of processing procedures is increased.

FIG. 12 illustrates an exemplary data-selector circuit provided for the general-purpose register file. In FIG. 12, a general-purpose register file 2 includes four sets of the above-described register-window configuration and eight general-purpose registers (global registers). According to FIGS. 11 and 12, the sum total of the registers becomes 160 (=8 [global]×4 [set]+(8 [local]+8 [inout]×8 [window]). As illustrated in FIG. 12, a readout circuit 3 including a multistage-selector circuit (not shown) is provided. The readout circuit 3 selects, for example, a single register from among the 160 registers and reads data of the selected register. The read data are stored in a source-latch circuit 4 and input to an accumulator 5 including an accumulator.

Incidentally, the method of detecting an error in data by adding a parity bit to data held in a register file and checking the parity bit added to the data has been used as one of methods of detecting a fault in an information processing apparatus. Further, the method of adding an error-correcting code (ECC) to data and correcting the data based on the ECC when an error is detected from the data has been used. For the information processing apparatus including the above described general-purpose register file, there have been demands for detecting an error and correcting data including the detected data.

Hitherto, main memories that were provided with an error-detection method achieved through the parity checking and a data-correction method performed based on the ECC have been available. For example, the main memory includes a plurality of main memory modules including, for example, a dual inline memory module (DIMM) storing data, an error detection-and-correction bit and a parity bit, a main processor configured to process information read from the main storage module, a parity-checking means arranged to perform the parity checking for the information read from the main storage module, and an error detection-and-correction means arranged to detect and correct an error in the information read from the main storage module. When the error is detected through the parity checking, the main processor suspends an information processing operation, and restarts the information processing operation after the error is corrected. Further, there have been information processing apparatuses including a memory holding data with the parity bit, a parity-checking means arranged to perform the parity checking, and an error-correction means arranged to perform the error correction based on error information transmitted from the parity-checking means.

However, since the information processing apparatus including the above described general-purpose register file is provided with multistage-selection logic in a path used to read data from the general-purpose register file, it takes much time to read the data from the general-purpose register file. Therefore, the marginal-operation frequency of a processor may be determined based on the path used to read data from the general-purpose register file. When the error-corrector using the ECC is provided in the above described read path, the time consumed to read data from the general-purpose register file is increased. Thus, it has been difficult to further provide the error-corrector in the read path.

On the other hand, according to the method of suspending the information processing operation and restarting the information processing operation after the error correction is performed, an instruction-controller or the like is informed of an error in read data when the error is detected, and the error-correction processing is performed. Therefore, the time consumed from when the error is detected to when the information processing apparatus returns to an ordinary operation state becomes equal to the sum of the time consumed to perform the error-informing processing and that consumed to perform the error-correction processing, which decreases the performance of the information processing apparatus. Further, since an error-correction state is provided in addition to the normal operation state, the configuration of a circuit controlling the error-correction state becomes complicated, which increases the amount of hardware, that is, the circuit amount.

A processor, an information processing apparatus, and a method of controlling the processor that allow for reducing the time consumed from when an error in read data is detected to when the error is corrected and the processor returns to the ordinary operation state are provided. A processor, an information processing apparatus, and a method of controlling the processor that allow for reducing the hardware amount are provided.

The processor, the information processing apparatus, and the method of controlling the processor allow for reducing the time consumed from when an error in read data is detected to when the error is corrected and the processor returns to the ordinary operation state, and reducing the hardware amount.

Japanese Laid-open Patent Publication No. 9-81465 and Japanese Laid-open Patent Publication No. 5-20215 are examples of related art.

SUMMARY

In an aspect of an invention, a processor includes an accumulator, a storage that outputs data to the accumulator, an error detector that outputs a first error detection signal upon detecting an error in the data, an error identifier that outputs an error identification signal indicating that an error occurs in the storage, an error identification signal holder that outputs the error identification signal as a second error detection signal, an error detection signal holder that holds the first error detection signal and outputs a cancellation signal to stop the accumulation processing of the accumulator, a first calculator that starts making a first calculation based on the second error detection signal and the cancellation signal, and outputs a correction start signal after a lapse of a calculation period, and an error corrector that corrects the error of the data upon receiving the correction start signal.

The above-described embodiments of the present invention are intended as examples, and all embodiments of the present invention are not limited to including the features described above.

DETAILED DESCRIPTION OF THE PREFERRED EMBODIMENTS

Figure 1:
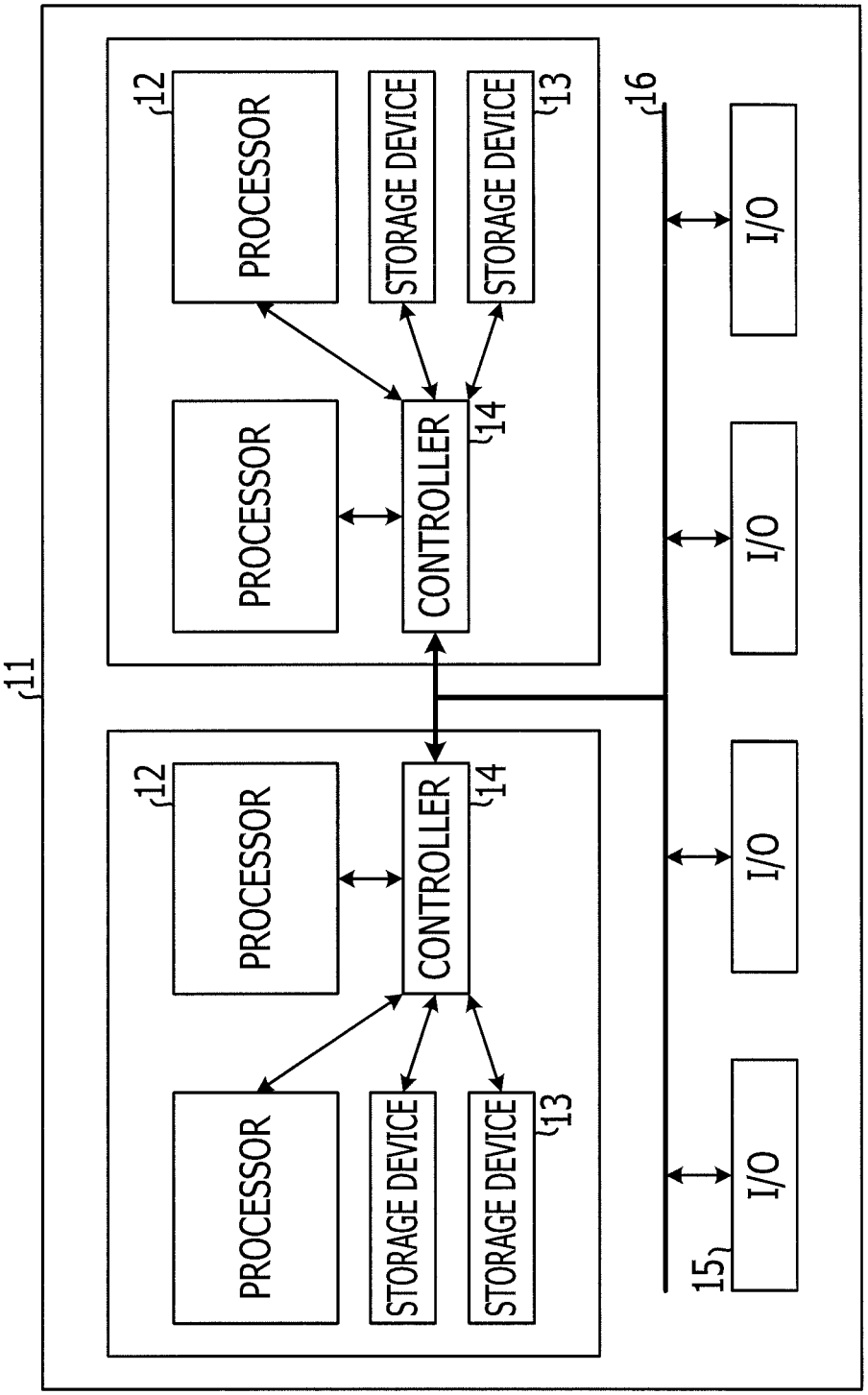
FIG. 1 illustrates an information processing apparatus according to a first embodiment.

Reference may now be made in detail to embodiments of the present invention, examples of which are illustrated in the accompanying drawings, wherein like reference numerals refer to like elements throughout.

Hereinafter, embodiments of a processor, an information processing apparatus, and a method of controlling the processor will be described in detail with reference to the attached drawings. In the description of each of the embodiments, the similar components are illustrated with the same reference numerals so that duplication of the description is eliminated.

A first embodiment illustrates the example where data output from a storage are wrong and an error in the output data is corrected.

[Description of Information Processing Apparatus]

FIG. 1 illustrates an information processing apparatus 11 according to the first embodiment. As illustrated in FIG. 1, the information processing apparatus 11 such as a server includes, for example, at least one processor 12 such as a central processing unit (CPU), at least one storage device 13, at least one controller 14, and at least one input-and-output interface (I/O) 15. The processor 12 and the storage device 13 are connected to the controller 14, for example. The controller 14 and the input-and-output I/O 15 are connected to each other via a bus 16. The processor 12 performs accumulation processing and data-error correction processing. The storage device 13 stores data and transmits data to the processor 12 under us the control of the controller 14. The storage device 13 includes a random access memory (RAM) module including, for example, a dual inline memory module (DIMM). The controller 14 controls the processor 12 and the storage device 13. Various peripheral devices (not illustrated) are connected to the input-and-output I/O 15. The peripheral devices may be various drive devices including a disk drive, a tape drive, and so forth, a communication card, etc.

[Description of Entire Processor]

Figure 2:
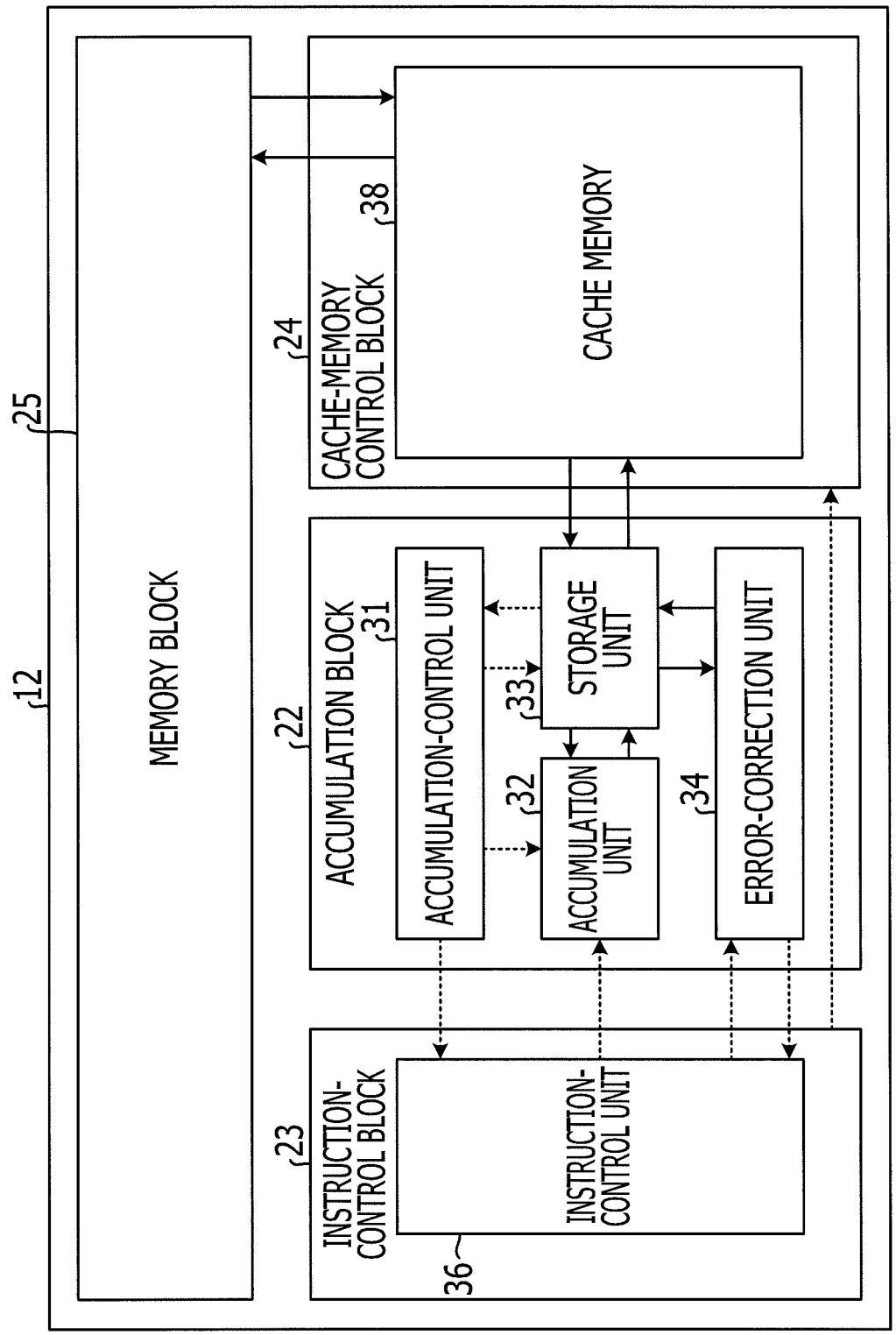
FIG. 2 illustrates an entire processor according to the first embodiment.

FIG. 2 illustrates the entire processor according to the first embodiment. In FIG. 2, each of solid arrows illustrates the flow of a data signal and each of dashed arrows illustrates the flow of a control signal. As illustrated in FIG. 2, the processor 12 includes an accumulation block 22, an instruction-control block 23, a cache-memory control block 24, and a memory block 25. The accumulation block 22 includes an accumulation-controller 31, an accumulator 32, a storage 33, and an error-corrector 34. The storage 33 may include, for example, a general-purpose register file 2 including the register window 1 illustrated in FIG. 11 and the readout circuit 3 illustrated in FIG. 12. The instruction-control block 23 includes an instruction-controller 36. The cache-memory control block 24 includes a cache memory 38. The accumulator 32 performs accumulation processing based on data output from the storage 33. The error-corrector 34 corrects an error in the data output from the storage 33. The storage 33 holds data output from the cache memory 38, accumulation-result data output from the accumulator 32, and data output from the error-corrector 34, the data being obtained through the error correction. The storage 33 outputs the data stored therein to the accumulator 32, the error-corrector 34, and the cache memory 38.

The cache memory 38 holds data output from the memory block 25 and outputs the data to the storage 33. The cache memory 38 outputs the data output from the storage 33 to the memory block 25. The accumulation-controller 31 controls the operation of each of the accumulator 32 and the instruction-controller 36 based on a control signal output from the storage 33. The accumulation-controller 31 controls data output from and/or input to the storage 33. The instruction-controller 36 controls the operation of each of the accumulator 32 and the error-corrector 34. The instruction-controller 36 is controlled through the error-corrector 34. The instruction-control block 23 controls the operation of the cache-memory control block 24. The memory block 25 stores part of and/or the entire data stored in the storage device 13 (see FIG. 1). The memory block 25 outputs data stored therein to the storage device 13 (see FIG. 1).

[Description of Main part of Processor]

Figure 3:
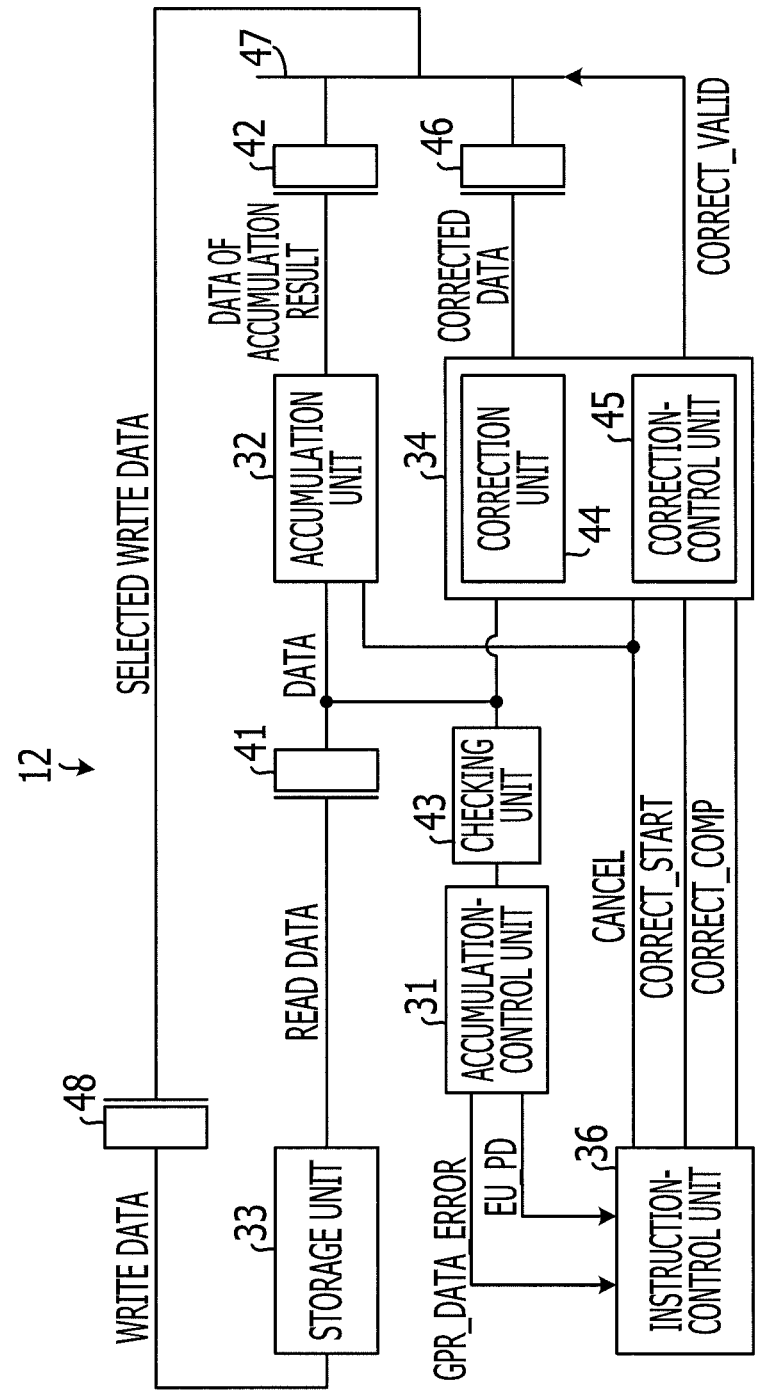
FIG. 3 illustrates the main part of the processor according to the first embodiment.

FIG. 3 illustrates the main part of the processor 12 according to the first embodiment. As illustrated in FIG. 3, the data output from the storage 33 are stored in a latch circuit 41. Data output from the latch circuit 41 is transferred to the accumulator 32, the error-corrector 34 provided to correct an error in data based on an error-correcting code (ECC) and a checker 43 performing the parity checking. The accumulator 32 performs accumulation processing based on the data output from the storage 33. The accumulation-result data output from the accumulator 32 are stored in a latch circuit 42. The checker 43 checks the parity of the data output from the storage 33. The accumulation-controller 31 outputs an error-detection signal EU_PD based on the result of the parity checking. The error-detection signal EU_PD is a signal illustrating that the data output from the storage 33 are incorrect.

When an error occurs in the storage 33, the accumulation-controller 31 outputs an error-identification signal GPR_DARA_ERROR which indicates that an error occurs in the storage 33. The checker 43 operates as an error-detector and the accumulation-controller 31 operates as an error-identifier. The instruction-controller 36 outputs a cancellation signal CANCEL and a correction-start signal CORRECT_START based on the error-detection signal EU_PD and the error-identification signal GPR_DATA_ERROR. The cancellation signal CANCEL is provided to stop the accumulation processing of the accumulator 32. The correction-start signal CORRECT_START is provided to make the error-corrector 34 start performing the data-error correction processing. The error-corrector 34 includes a corrector 44 and a correction-controller 45. The corrector 44 corrects an error in the data output from the storage 33. The correction-controller 45 controls the operation of the corrector 44 based on the correction-start signal CORRECT_START.

The data output from the error-corrector 34, the data being obtained through the error correction, are stored in a latch circuit 46. The error-corrector 34 outputs a correction-valid signal CORRECT_VALID and a correction-completion signal CORRECT_COMP. The correction-valid signal CORRECT_VALID indicates that the data output from the error-corrector 34, the data being obtained through the error correction, is valid. The correction-valid signal CORRECT_VALID is asserted while the error-corrector 34 performs the data-error-correction processing (see FIG. 5). A selector 47 selects the data subjected to the error correction, the data being stored in the latch circuit 46, while the correction-valid signal CORRECT_VALID is asserted. The selector 47 selects the accumulation-result data stored in the latch circuit 42 while the correction-valid signal CORRECT_VALID is deasserted. That is, the selector 47 outputs the data output from the error-corrector 34, the data being obtained through the error correction, while the error-corrector 34 performs the data-error-correction processing. At other times, the selector 47 outputs the accumulation-result data output from the accumulator 32.

The data selected through the selector 47 are stored in a latch circuit 48. Data output from the latch circuit 48 are written into the storage 33 as write data. The instruction-controller 36 restarts the execution of instructions based on the correction-completion signal CORRECT_COMP. The correction-completion signal CORRECT_COMP indicates that the error-corrector 34 completes the data-error correction processing. Referring to the correspondence between the entire configuration illustrated in FIG. 2 and the main part configuration illustrated in FIG. 3, the checker 43 illustrated in FIG. 3 is included in the storage 33 in FIG. 2. Further, the control signal output from the accumulation-controller 31 to each of the accumulator 32 and the storage 33 is omitted in FIG. 3.

[Description of Instruction-Controller]

Figure 4:
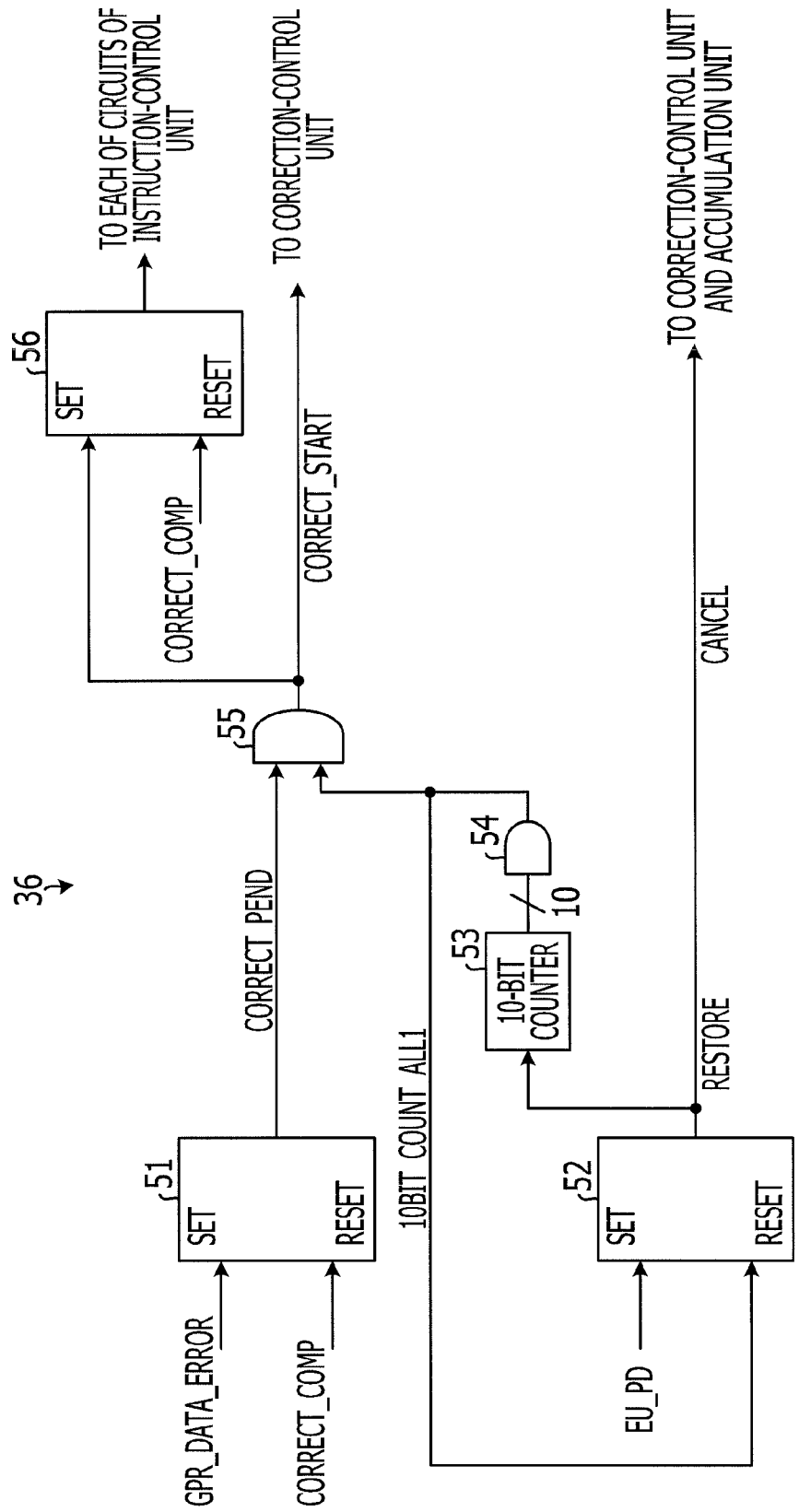
FIG. 4 illustrates the main part of an instruction-controller according to the first embodiment.
Figure 5:
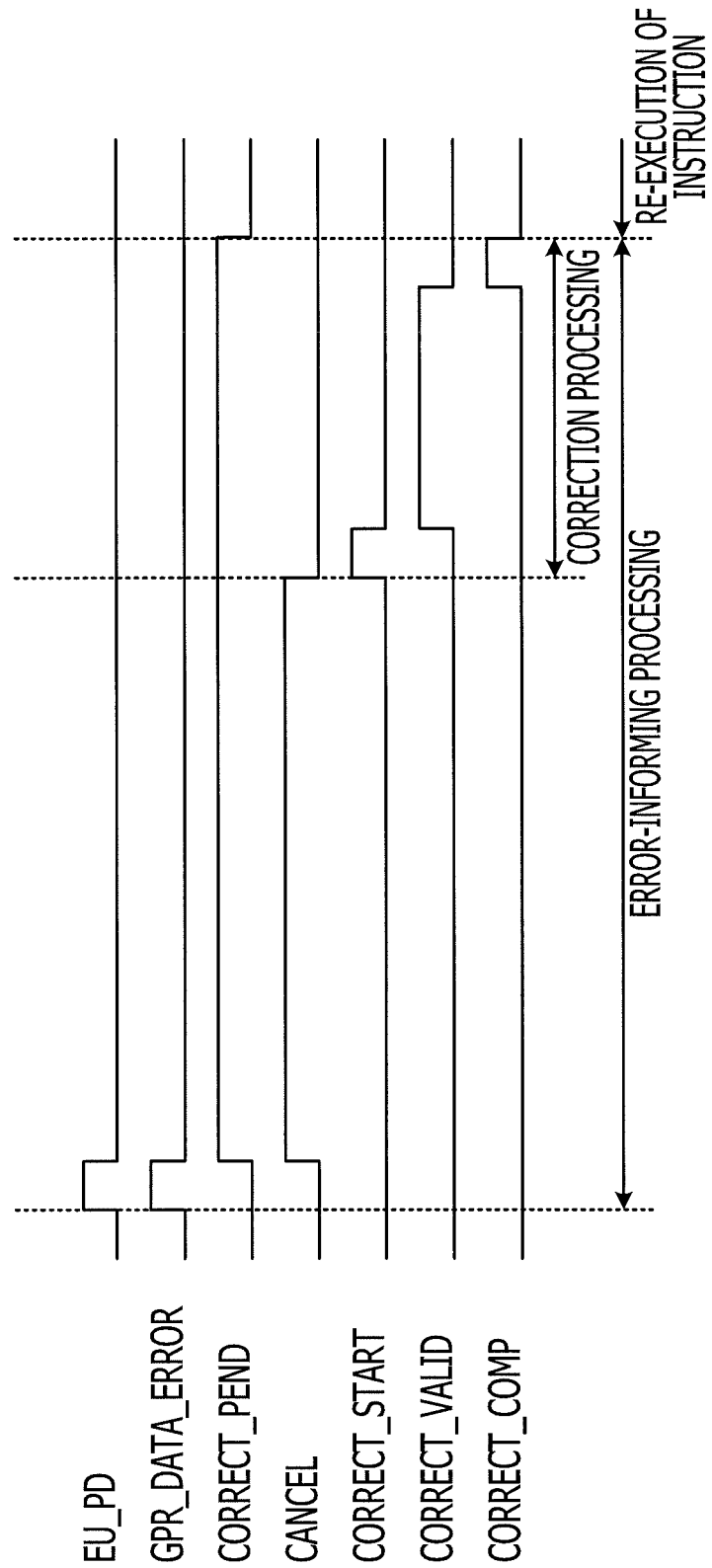
FIG. 5 illustrates the operation timing of the processor according to the first embodiment.

FIG. 4 illustrates the main part of the instruction-controller 36 according to the first embodiment. FIG. 5 illustrates the operation timing of the processor 12 according to the first embodiment. As illustrated in FIG. 4, the instruction-controller 36 includes an error-identification-signal holder 51, an error-detection-signal holder 52, a counter 53, AND circuits 54 and 55, and a correction-state holder 56. As illustrated in FIGS. 4 and 5, the error-identification-signal holder 51 is set when the error-identification signal GPR_DATA_ERROR is asserted. The error-identification signal GPR_DATA_ERROR is asserted over a predetermined time period in the case where the data output from the storage 33 are incorrect due to an error occurring in the storage 33. The error-identification-signal holder 51 is reset (initialized) when the correction-completion signal CORRECT_COMP is asserted. The correction-completion signal CORRECT_COMP is asserted over a predetermined time period when the error-corrector 34 completes the data-correction processing. The error-identification signal GPR_DATA_ERROR and the correction-completion signal CORRECT_COMP are not asserted at the same time. The error-identification-signal holder 51 outputs an error-detection-flag signal CORRECT_PEND which is asserted during the duration between the setting and the resetting (initializing) of the error-identification-signal holder 51.

The error-detection-signal holder 52 is set when the error-detection signal EU_PD is asserted. The error-detection signal EU_PD is asserted over a predetermined time period when there is an error in the data output from the storage 33. The error-detection-signal holder 52 is reset (initialized) when a reset signal 10BIT_COUNT_ALL1 is asserted. The reset signal 10BIT_COUNT_ALL1 is asserted over a predetermined time period when the counter 53 reaches a predetermined value. The error-detection signal EU_PD and the reset signal 10BIT_COUNT_ALL1 are not asserted at the same time. The error-detection-signal holder 52 outputs a restoration signal RESTORE which is output to the correction-controller 45 (see FIG. 3) and the accumulator 32 (see FIG. 3) as the cancellation signal CANCEL. The restoration signal RESTORE (logically identical to the cancellation signal CANCEL) is asserted over the duration between the setting and the resetting (initializing) of the error-detection-signal holder 52.

The counter 53 performs counting and determines whether the time consumed to inform the controller 14 (see FIG. 1) provided outside the processor 12 that an error occurs in the data output from the storage 33 had elapsed since the counting was started. Although the bit number of the counter 53 is not specifically limited, the bit number is exemplarily determined to be 10 in the first embodiment. When the restoration signal RESTORE is asserted, the counter 53 starts counting from the initial value (e.g., 0). When the counter 53 reaches a predetermined value, the counter 53 wraps around to the initial value. The first AND circuit 54 outputs the logical AND of the values of the bits of the counter 53 as the reset signal 10BIT_COUNT_ALL1. In the case of the 10-bit counter 53, for example, the reset signal 10BIT_COUNT_ALL1 is asserted when the value of the counter 53 becomes "1111111111". When the reset signal 10BIT_COUNT_ALL1 is asserted, the cancellation signal CANCEL is deasserted. Consequently, the operation of each of the correction-controller 45 (see FIG. 3) and the accumulator 32 (see FIG. 3) is stopped over the time period from when an error occurs in the data output from the storage 33 to when the value of the counter 53 becomes "1111111111", for example.

The second AND circuit 55 outputs data of the logical AND of the error-detection-flag signal CORRECT_PEND and the reset signal 10BIT_COUNT_ALL1 as the correction-start signal CORRECT_START. The correction-start signal CORRECT_START is asserted over a predetermined period immediately after a lapse of the time period from when the error occurs in the data output from the storage 33 to when the value of the counter 53 becomes "1111111111", that is, after the controller 14 (see FIG. 1) provided outside the processor 12 is informed of the error. When the correction-start signal CORRECT_START is asserted, the correction-controller 45 (see FIG. 3) starts the data-error correction processing.

The correction-state holder 56 is set when the correction-start signal CORRECT_START is asserted. The correction-state holder 56 is reset (initialized) when the correction-completion signal CORRECT_COMP is asserted. When the correction-state holder 56 is set, a signal indicating that the processor 12 is in the error-correction state is transferred to each of the circuits of the instruction-controller 36. Accordingly, the processor 12 is maintained in the error-correction state. When the correction-state holder 56 is reset (initialized), a signal indicating that the processor 12 is returned from the error-correction state to the normal state is transferred to each of the circuits of the instruction-controller 36. Accordingly, the processor 12 executes an instruction again based on the instruction-controller 36 and the accumulator 32, and starts ordinary processing again. The processor 12 is maintained in the ordinary state.

[Description of Operation timing]

Changes in the signals will be described in time sequence. When the parity-checking result indicates that the data output from the storage 33 are incorrect, the error-detection signal EU_PD output from the accumulation-controller 31 is asserted. Accordingly, the cancellation signal CANCEL (logically equivalent to the restoration signal RESTORE) output from the error-detection-signal holder 52 is asserted so that the operation of each of the accumulator 32 and the error-corrector 34 is stopped and the counter 53 starts counting. Further, when the incorrect data is output from the storage 33 due to the error occurring in the storage 33, the error-identification signal GPR_DATA_ERROR output from the accumulation-controller 31 is asserted. Accordingly, the error-detection-flag signal CORRECT_PEND output from the error-identification-signal holder 51 is asserted.

The error-informing processing performed for the controller provided outside the processor 12 and that performed inside the processor 12 are finished during the time period from when the counter 53 starts counting to when the counter 53 reaches the predetermined value. When the counter 53 reaches the predetermined value, the reset signal 10BIT_COUNT_ALL1 is asserted so that the cancellation signal CANCEL (logically equivalent to the restoration signal RESTORE) is deasserted, the counter 53 returns to the initial value and is stopped, and each of the accumulator 32 and the error-corrector 34 starts the operation again. Then, at the same time as when the reset signal 10BIT_COUNT_ALL1 is asserted, the correction-start signal CORRECT_START is asserted, the processor 12 is shifted to the error-correction state, and the error-corrector 34 starts the data-error correction processing. Further, since the correction-valid signal CORRECT_VALID is asserted due to the assertion of the correction-start signal CORRECT_START, the selector 47 outputs the data subjected to the error-correction performed through the error-corrector 34. When the error-corrector 34 completes the data-error correction processing, the correction-completion signal CORRECT_COMP output from the error-corrector 34 is asserted. Accordingly, the state of the processor 12 is shifted to the ordinary state and the correction-valid signal CORRECT_VALID is deasserted so that the selector 47 outputs data of the accumulation result obtained through the accumulator 32.

[Description of Method of Controlling Processor]

Figure 6:
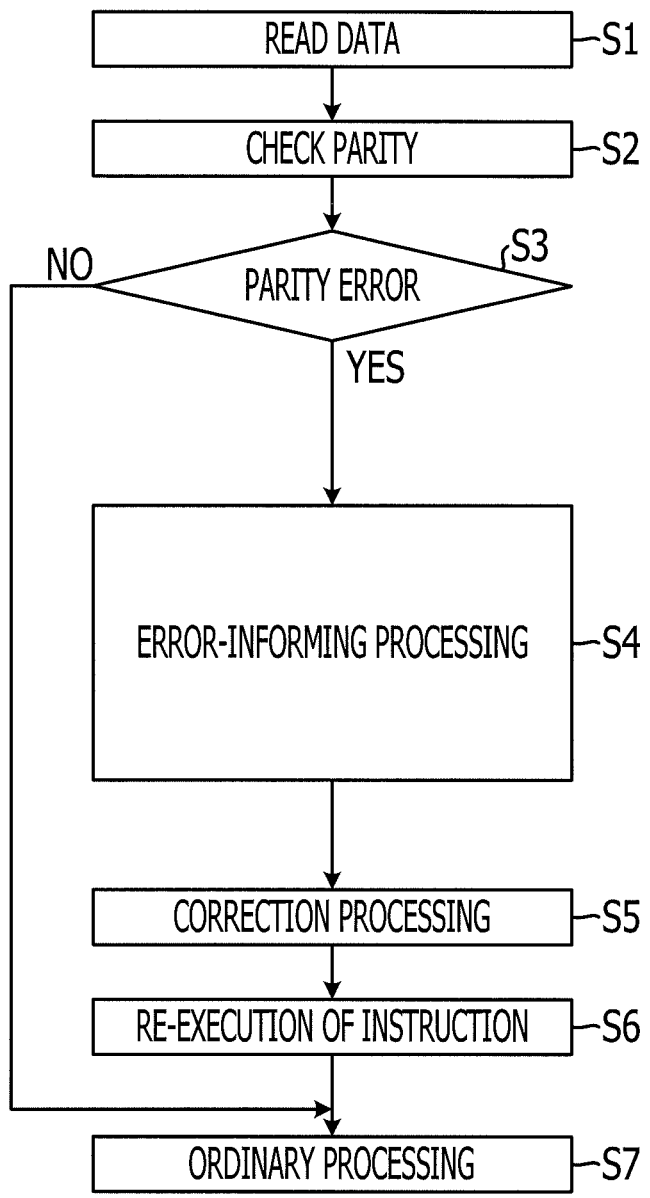
FIG. 6 illustrates the flow of processing performed in the processor according to the first embodiment.

FIG. 6 illustrates the flow of processing performed in the processor 12 according to the first embodiment. As illustrated in FIG. 6, the processor 12 reads data from the storage 33 (operation (S1)), and checks the data parity through the checker 43 (operation (S2)). If the result of the parity checking shows that there is no error in the data output from the storage 33 (No for operation (S3)), the accumulator 32 performs ordinary accumulation processing based on the data output from the storage 33 (operation (S7)). If the result of the parity checking shows that there is an error in the data output from the storage 33 (Yes for operation (S3)), the processor 12 stops the processing of each of the accumulator 32 and the error-corrector 34, and starts the counting through the counter 53 of, for example, 10 bits. The processor 12 performs the error-informing processing before the counter 53 reaches the predetermined value (operation (S4)). When the counter 53 reaches the predetermined value, the processor 12 performs the data-error correction processing through the error-corrector 34 (operation (S5)). When the error-correction processing is completed, the processor 12 executes the instruction again through the instruction-controller 36 and the accumulator 32 (operation (S6)), and the processor 12 starts performing the ordinary processing again (operation (S7)).

The first embodiment allows for detecting an error in data through the parity checking and correcting the data error based on the error-correcting code. Therefore, the data error can be corrected through the processor 12 including, for example, the general-purpose register file 2 including the register window 1 illustrated in FIG. 11 and the readout circuit 3 illustrated in FIG. 12. Further, the error-corrector 34 may not be provided in a path used to read data from the general-purpose register file 2. Further, the data error can also be detected and corrected through the information processing apparatus 11 including the above described processor 12.

Figure 11:
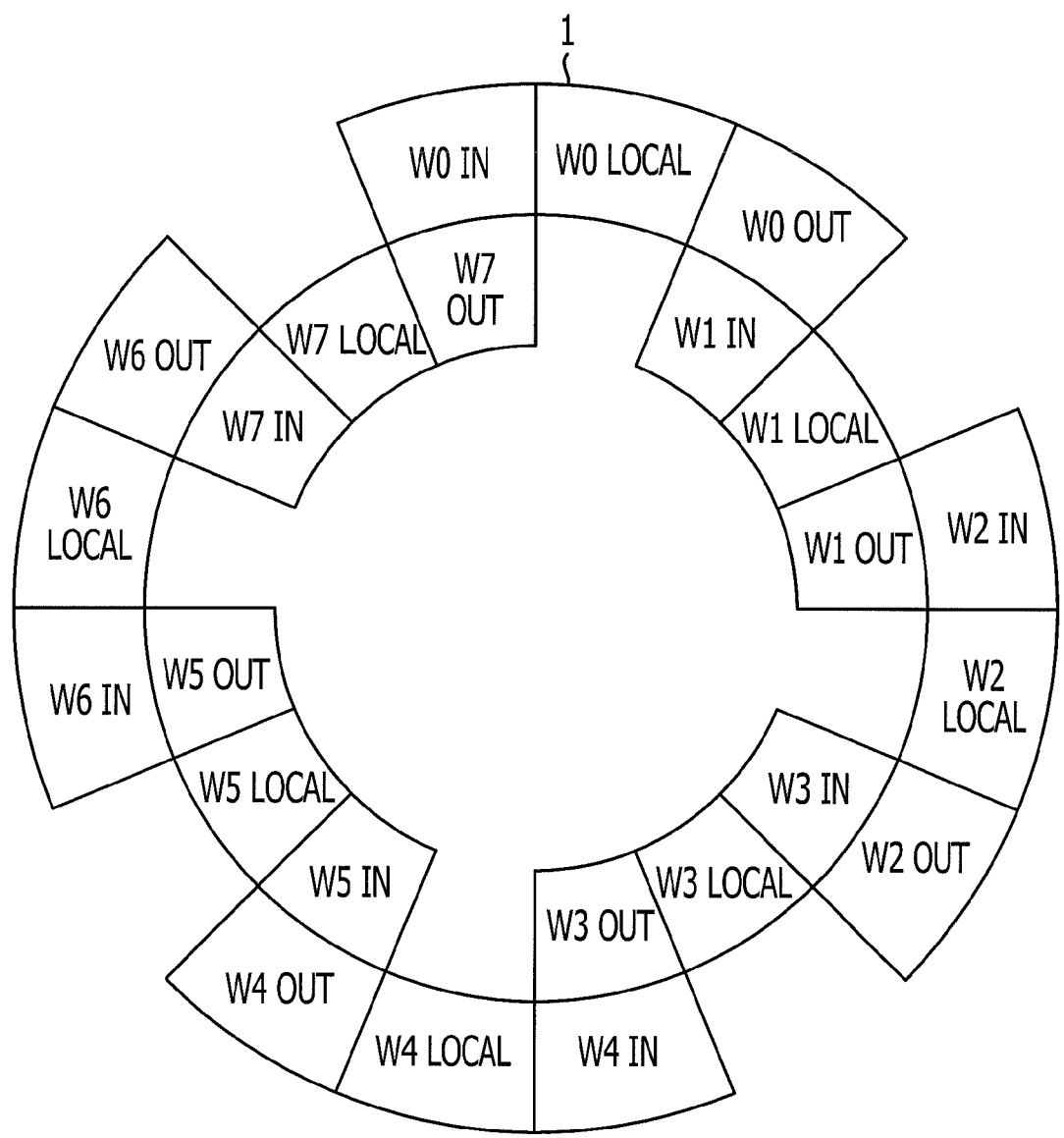
FIG. 11 illustrates an exemplary register window of a general-purpose register file.
Figure 12:
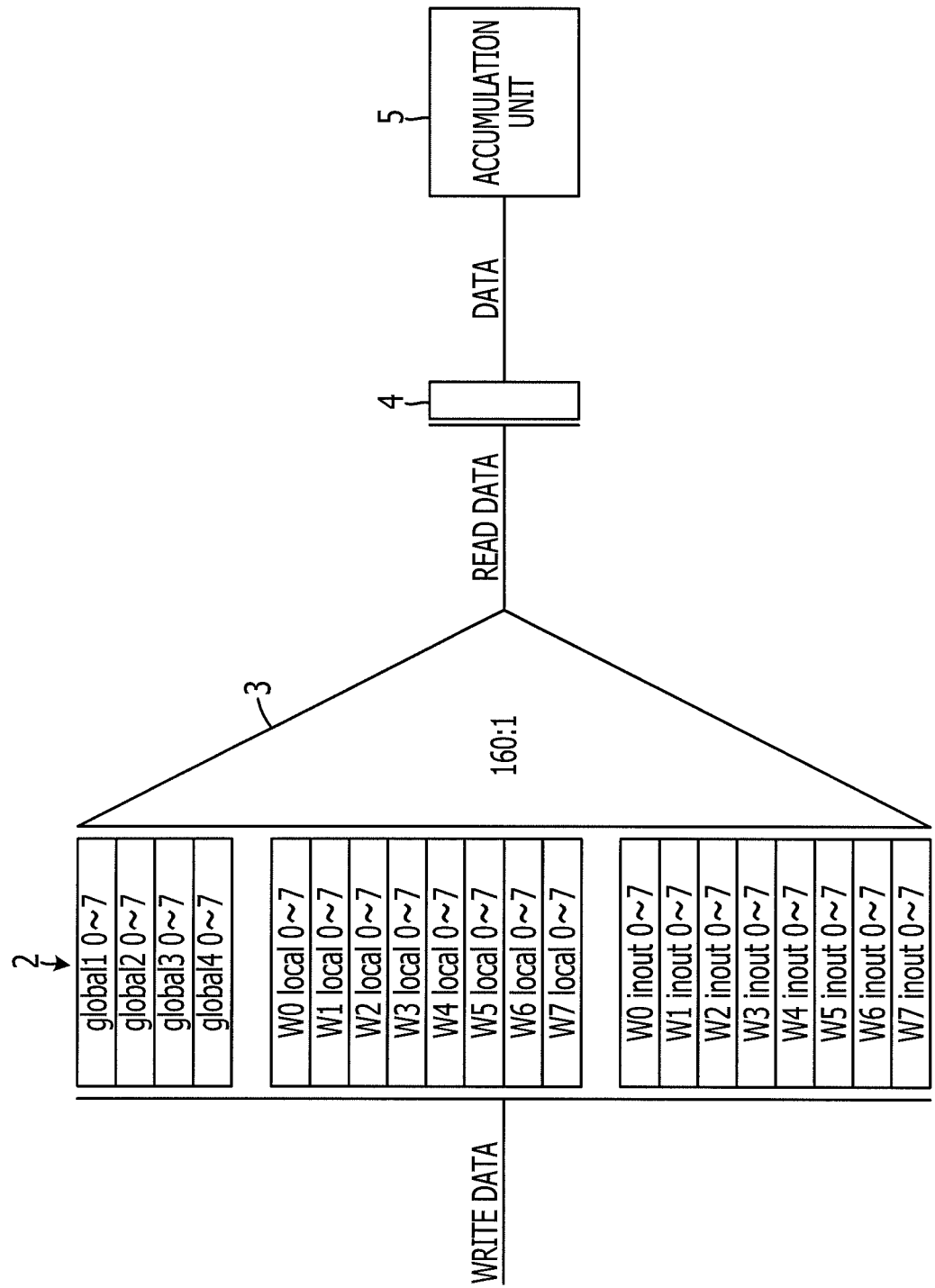
FIG. 12 illustrates an exemplary data-selector circuit provided for the general-purpose register file.

According to a processor provided with the general-purpose register file 2 including, for example, the register window 1 illustrated in FIG. 11 and the readout circuit 3 illustrated in FIG. 12, the error-informing processing performed inside the processor is finished in a time shorter than that consumed to perform the error-informing processing performed for a controller provided outside the processor. The time consumed to perform the error-informing processing inside the processor corresponds to a few cycles, for example. In a second embodiment, for example, the processor performs the error-informing processing for the controller provided outside the processor and the data-error correction processing in parallel for correcting an error occurring in data output from the general-purpose register file. Since the entire configuration of an entire information-processing apparatus according to the second embodiment is the similar as that described in the first embodiment illustrated in FIG. 1, the description thereof is omitted. The entire configuration of the processor is the similar as that described in the first embodiment illustrated in FIG. 2, the description thereof is omitted. However, since the processor does not enter the error-correction state in the second embodiment, there is no control signal in the configuration illustrated in FIG. 2, the control signal being used through the error-corrector 34 for informing the instruction-controller 36 that the error-correction state ends.

[Description of Main part of Processor]

Figure 7:
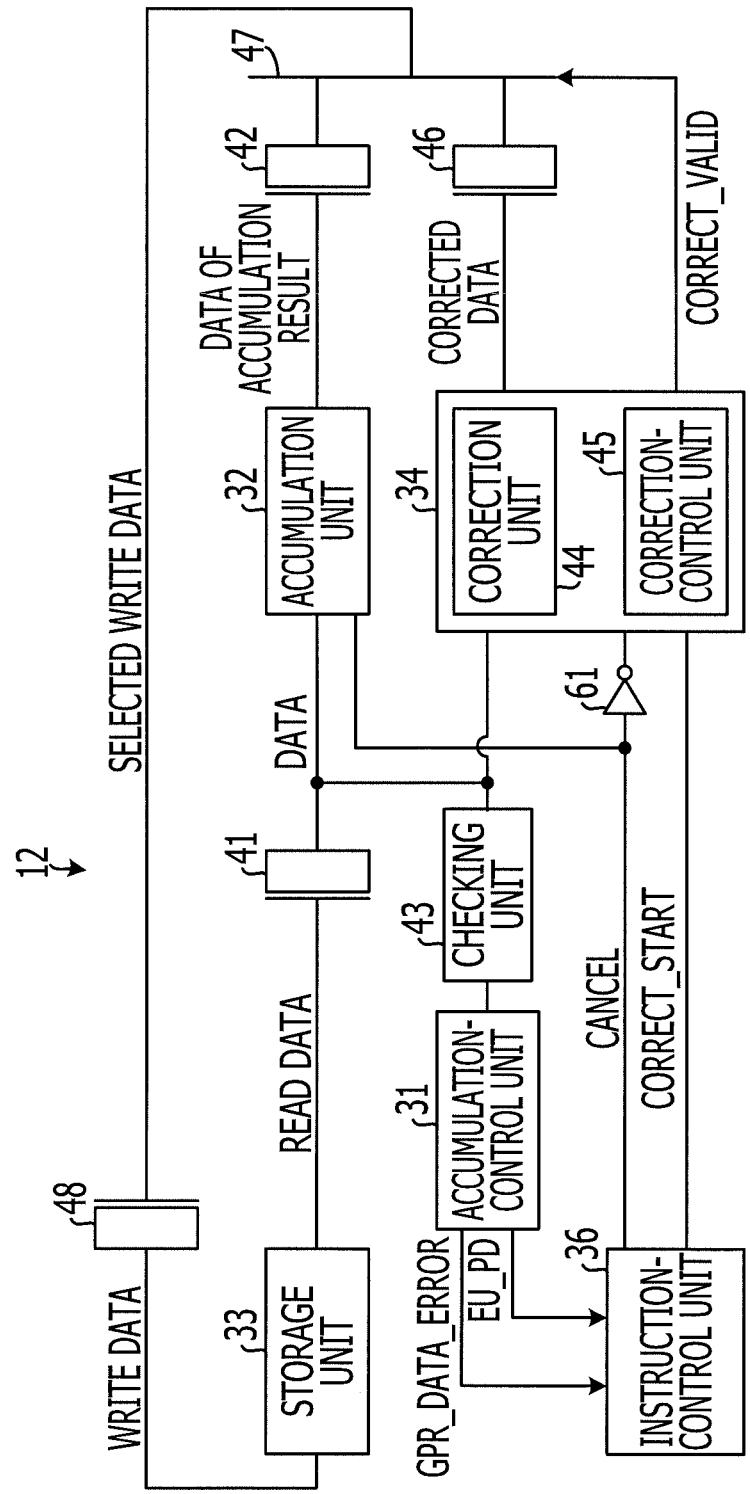
FIG. 7 illustrates the main part of a processor according to a second embodiment.

FIG. 7 illustrates the main part of the processor according to the second embodiment. According to a configuration illustrated in FIG. 7, the second embodiment is different from the first embodiment in that the cancellation signal CANCEL is inverted through an inverter 61 and is input to the error-corrector 34, the correction-completion signal CORRECT_COMP is not output from the error-corrector 34 to the instruction-controller 36, and the correction-valid signal CORRECT_VALID is asserted during the time period where cancellation signal CANCEL is asserted after the correction-start signal CORRECT_START is asserted. As for the configuration of the main part of the processor, the other configuration is the similar as that illustrated in FIG. 3, so that the description thereof is omitted. The correspondence between the entire configuration illustrated in FIG. 2 and the configuration of the main part illustrated in FIG. 7 is the similar as that between FIGS. 2 and 3, which is described in the first embodiment.

[Description of Instruction-Controller]

Figure 8:
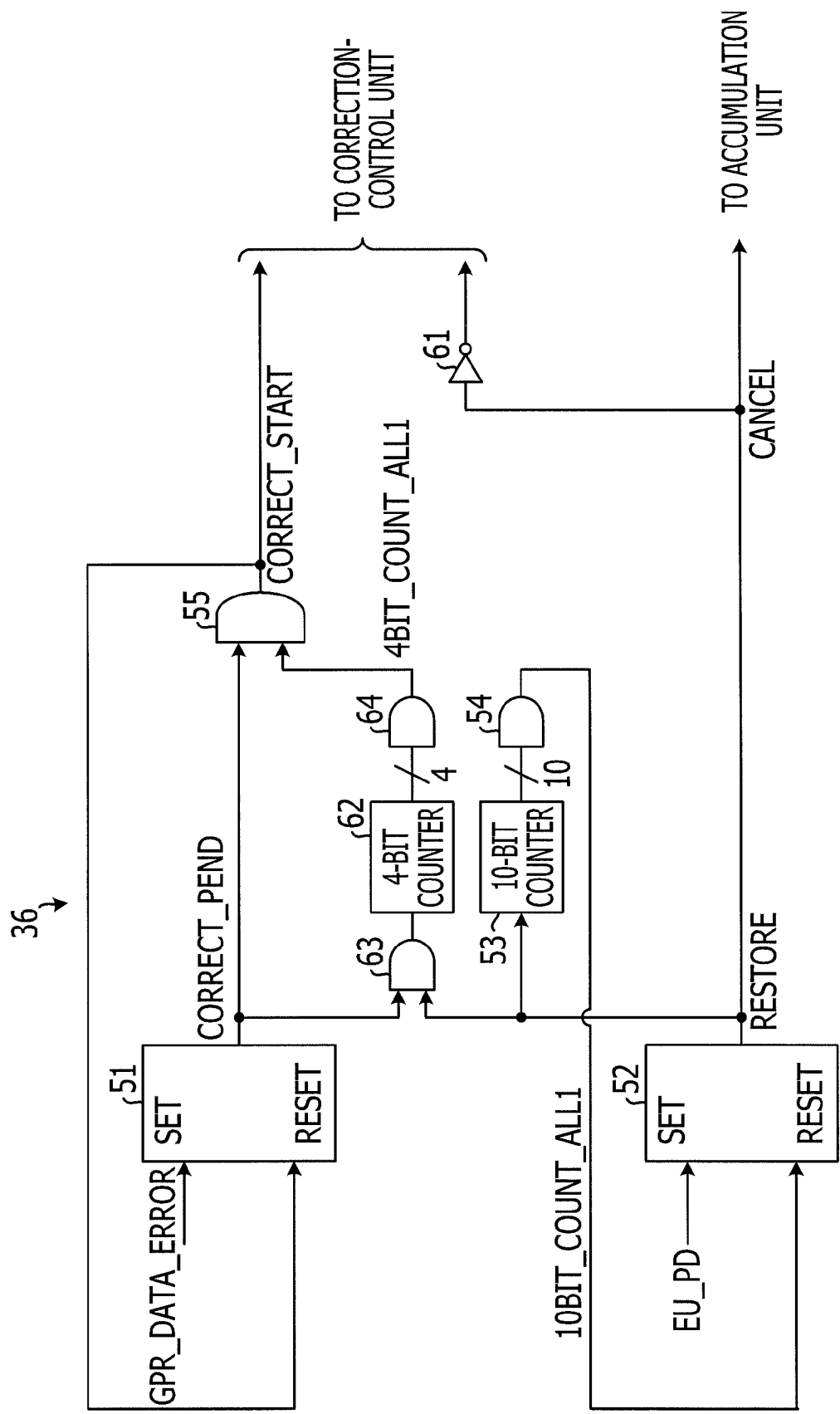
FIG. 8 illustrates the main part of an instruction-controller according to the second embodiment.
Figure 9:
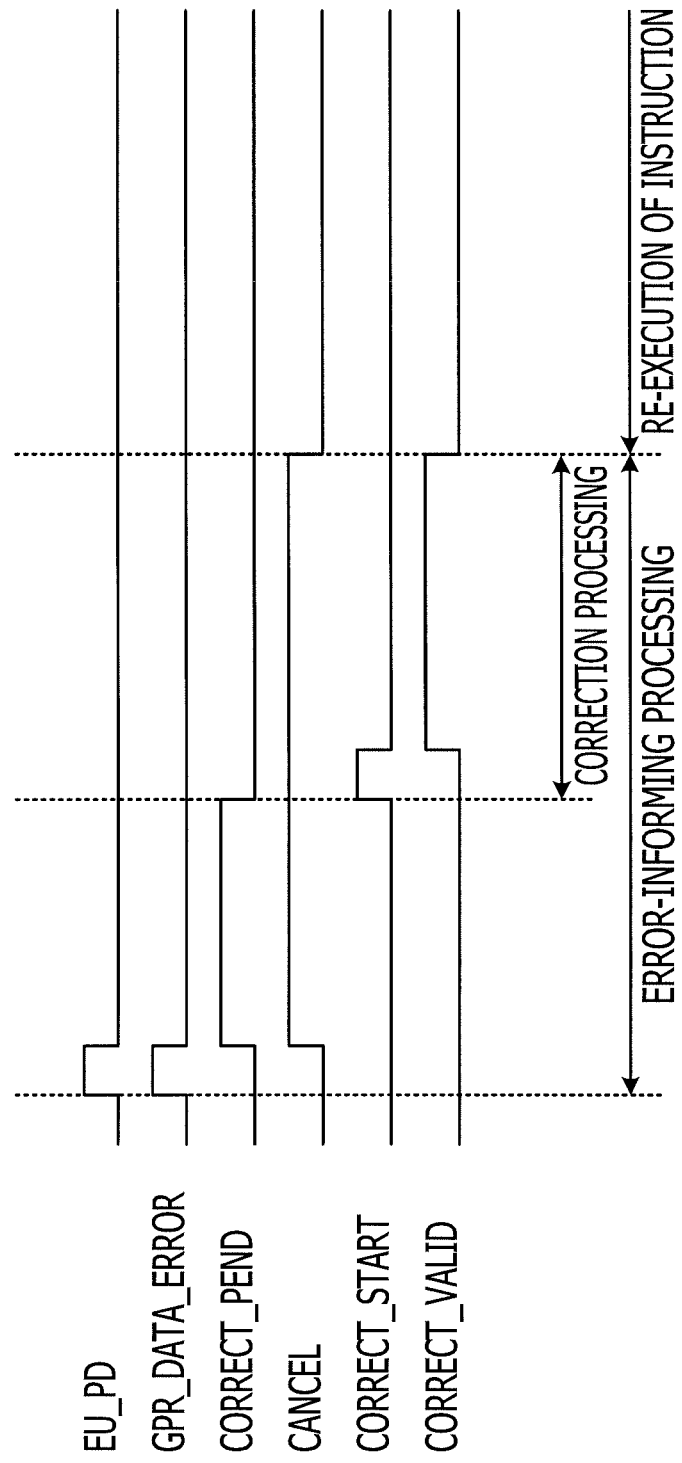
FIG. 9 illustrates the operation timing of the processor according to the second embodiment.

FIG. 8 illustrates the main part of the instruction-controller 36 according to the second embodiment. FIG. 9 illustrates the operation timing of the processor 12 according to the second embodiment. As illustrated in FIG. 8, the instruction-controller 36 includes the error-identification-signal holder 51, the error-detection-signal holder 52, the counter 53, a counter 62, the AND circuits 54 and 55, and AND circuits 63 and 64. For differentiating between the two counters 53 and 62, the counter 62 which is additionally provided in the second embodiment is determined to be the first counter 62, and the counter 53 that had been provided in the first embodiment is determined to be the second counter 53. Further, for differentiating between the four AND circuits 54, 55, 63 and 64, the AND circuit 63 added to the input of the first counter 62 in the second embodiment is determined to be the third AND circuit 63 and the AND circuit 64 added to the output of the first counter 62 is determined to be the fourth AND circuit 64. The correction-state holder 56 is not provided in the second embodiment. The difference between the configuration of the second embodiment and that of the first embodiment illustrated in FIG. 4 will only be described.

As illustrated in each of FIGS. 8 and 9, the error-identification-signal holder 51 is reset (initialized) when the correction-start signal CORRECT_START is asserted. The error-identification signal GPR_DATA_ERROR and the correction-start signal CORRECT_START are not asserted at the same time. The error-detection-flag signal CORRECT_PEND output from the error-identification-signal holder 51 is asserted during the duration between the setting and the resetting (initializing) of the error-identification-signal holder 51.

The restoration signal RESTORE (the cancelation signal CANCEL) output from the error-detection-signal holder 52 is transferred to the accumulator 32 (see FIG. 3), as it is, and the logic of the restoration signal RESTORE is inverted through the inverter 61 and the restoration signal RESTORE is transferred to the correction-controller 45 (see FIG. 3). Therefore, the operation of the accumulator 32 (see FIG. 3) is stopped over the time period where the restoration signal RESTORE (logically equivalent to the cancellation signal CANCEL) is asserted. In the time period where the restoration signal RESTORE (logically equivalent to the cancelation signal CANCEL) is asserted, the operation of the correction-controller 45 (see FIG. 3) is stopped until the correction-start signal CORRECT_START is asserted and is not stopped after the correction-start signal CORRECT_START is asserted. That is, the error-corrector 34 also performs the data-error correction processing during the time period where the restoration signal RESTORE (logically equivalent to the cancellation signal CANCEL) is asserted.

When the restoration signal RESTORE is asserted, the second counter 53 starts counting from the initial value (e.g., 0) and returns to the initial value after reaching a predetermined value. The bit number of the second counter 53 may be of any value so long as the bit number is appropriate for measuring a time which is equal to and/or longer than the time consumed to inform the controller 14 (see FIG. 1) provided outside the processor 12 of an error. In the second embodiment, the bit number of the second counter 53 is exemplarily determined to be 10. When the value of the second counter 53 reaches the predetermined value (e.g., "1111111111"), the reset signal 10BIT_COUNT_ALL1 output from the first AND circuit 54 is asserted so that the error-detection-signal holder 52 is reset (initialized) and the cancellation signal CANCEL is deasserted. Consequently, the accumulator 32 (see FIG. 3) restarts ordinary processing operations and the operation of the error-correction processing of the correction-controller 45 (see FIG. 3) is stopped. Each of the second counter 53 and the first AND circuit 54 operates as the second calculator.

The third AND circuit 63 outputs the logical AND of the error-detection-flag signal CORRECT_PEND and the restoration signal RESTORE (logically equivalent to the cancellation signal CANCEL). Therefore, when both the error-detection-flag signal CORRECT_PEND and the restoration signal RESTORE (logically equivalent to the cancellation signal CANCEL) are asserted, the first counter 62 starts counting from the initial value (e.g., 0) and returns to the initial value after reaching the predetermined value. Both the error-detection-flag signal CORRECT_PEND and the restoration signal RESTORE (logically equivalent to the cancellation signal CANCEL) are asserted when both the error-identification-signal holder 51 and the error-detection-signal holder 52 are set.

The bit number of the first counter 62 may be of any value so long as the bit number is appropriate to measure a time equivalent to and/or longer than the time consumed to perform the error-informing processing inside the processor 12 and is smaller than the bit number of the second counter 53. Although the bit number of the first counter 62 is not specifically limited, the bit number is exemplarily determined to be four in the present embodiment. When the value of the first counter 62 reaches a predetermined value (e.g., "1111"), the first calculation-period-elapse signal 4BIT_COUNT_ALL1 output from the fourth AND circuit 64 is asserted. The time when the first counter 62 starts counting falls behind the time when the second counter 53 starts counting by as much as the time consumed until a signal propagates through the third AND circuit 63. Therefore, the first counter 62 reaches the predetermined value faster than the second counter 53 does. The third AND circuit 63, the first counter 62, and the fourth AND circuit 64 operate as a first calculator.

The second AND circuit 55 outputs the logical AND of the error-detection-flag signal CORRECT_PEND and the first calculation-period-elapse signal 4BIT_COUNT_ALL1 as the correction-start signal CORRECT_START. The correction-start signal CORRECT_START is asserted over a predetermined time period immediately after a lapse of the time period from when an error occurs in the storage 33 to when the value of the first counter 62 becomes, for example, "1111", that is, after the error-informing processing performed inside the processor 12 is completed. When the correction-start signal CORRECT_START is asserted, the correction-controller 45 (see FIG. 3) starts the data-error-correction processing. When the correction-start signal CORRECT_START is asserted, the error-identification-signal holder 51 is reset (initialized) so that each of the error-detection-flag signal CORRECT_PEND and the correction-start signal CORRECT_START is deasserted.

[Description of Operation Timing]

Changes in the signals will be described in time sequence. When the parity-checking result indicates that the data output from the storage 33 are incorrect, the error-detection signal EU_PD output from the accumulation-controller 31 is asserted as illustrated in FIG. 9. Accordingly, the cancellation signal CANCEL (logically equivalent to the restoration signal RESTORE) output from the error-detection-signal holder 52 is asserted, and the operation of the accumulator 32 is stopped and the second counter 53 starts counting. Further, when the incorrect data are output from the storage 33 due to the error occurring in the storage 33, the error-identification signal GPR_DATA_ERROR output from the accumulation-controller 31 is asserted. Accordingly, the error-detection-flag signal CORRECT_PEND output from the error-identification-signal holder 51 is asserted and the first counter 62 starts counting.

The error-informing processing performed inside the processor 12 is completed during the time period from when the first counter 62 starts counting to when the first counter 62 reaches the predetermined value (the first calculation period). After reaching the predetermined value, the first counter 62 returns to the initial value and is stopped, and the first calculating-period-elapse signal 4BIT_COUNT_ALL1 is asserted. Consequently, the correction-start signal CORRECT_START is asserted so that the error-corrector 34 starts the data-error-correction processing. Further, since the correction-valid signal CORRECT_VALID is asserted due to the assertion of the correction-start signal CORRECT_START, the selector 47 outputs data obtained through the error correction performed through the error-corrector 34. When the correction-start signal CORRECT_START is asserted, the error-detection-flag signal CORRECT_PEND is deasserted.

After that, the second counter 53 reaches the predetermined value. The error-informing processing performed for the controller provided outside the processor 12 is completed during the time period from when the second counter 53 starts counting to when the second counter 53 reaches the predetermined value (the second calculation period). When the second counter 53 reaches the predetermined value, the second counter 53 returns to the initial value and is stopped, and the reset signal 10BIT_COUNT_ALL1 is asserted. Consequently, the cancellation signal CANCEL (logically equivalent to the restoration signal RESTORE) is deasserted so that the accumulator 32 starts operating again and the error-corrector 34 stops operating. Further, since the correction-valid signal CORRECT_VALID is deasserted, the selector 47 outputs data of the accumulation result obtained through the accumulator 32.

[Description of Method of Controlling Processor]

Figure 10:
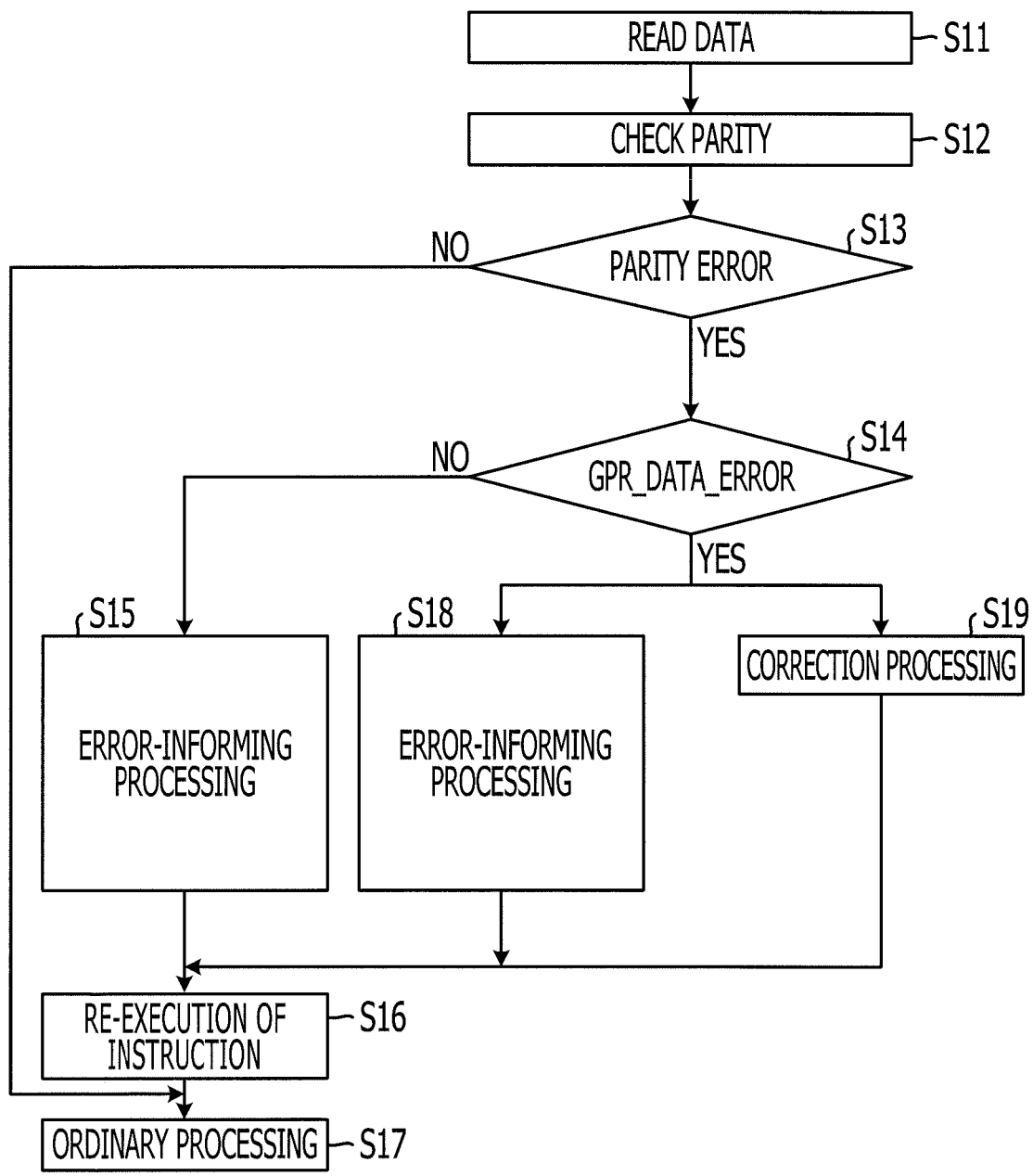
FIG. 10 illustrates the flow of processing performed in the processor according to the second embodiment.

FIG. 10 illustrates the flow of processing performed in the processor 12 according to the second embodiment. As illustrated in FIG. 10, the processor 12 reads data from the storage 33 (operation (S11)), and checks the data parity through the checker 43 (operation (S12)). If the result of the parity checking shows that there is no error in the data output from the storage 33 (No for operation (S13)), the accumulator 32 performs the ordinary accumulation processing based on the data output from the storage 33 (operation (S17)). If the result of the parity checking shows that there is an error in the data output from the storage 33 (Yes for operation (S13)), the processor 12 determines whether an error occurs in the storage 33. The above described determination may be made based on the state of the error-identification signal GPR_DATA_ERROR (operation (S14)).

When the error-identification signal GPR_DATA_ERROR is deasserted, no error occurs in the storage 33 (No for operation (S14)). Therefore, the processor 12 makes the accumulator 32 stop performing the processing and makes the second counter 53 start counting. The processor 12 performs the error-informing processing before the second counter 53 reaches the predetermined value (operation (S15)). When the second counter 53 reaches the predetermined value, the processor 12 executes an instruction again through the accumulator 32 (operation (S16)), and restarts the ordinary processing (operation (S17)).

On the other hand, when the error-identification signal GPR_DATA_ERROR is asserted, an error occurs in the storage 33 (Yes for operation (S14)). Therefore, the processor 12 makes each of the accumulator 32 and the error-corrector 34 stop performing the processing, and makes each of the first and second counters 62 and 53 start counting. The processor 12 completes the error-informing processing performed inside the processor 12 before the first counter 62 reaches the predetermined value. Further, the processor 12 completes the error-informing processing performed for the controller provided outside the processor 12 before the second counter 53 reaches the predetermined value (operation (S18)). After the first counter 62 reaches the predetermined value, the processor 12 performs the data-error-correction processing through the error-corrector 34 before the second counter 53 reaches the predetermined value (operation (S19)). When the error-informing processing and the error-correction processing are completed, the processor 12 executes an instruction again through the accumulator 32 (operation (S16)), and restarts the ordinary processing (operation (S17)).

The similar effect as that attained through the first embodiment can also be attained through the second embodiment. Further, since the error-informing processing and the error-correction processing are performed in parallel, the time consumed from when the error in the data read from the storage 33 is detected to when the error is corrected and the processor 12 returns to an ordinary operation state becomes equivalent to the time consumed to perform the error-informing processing. That is, the processor 12 can return to the ordinary operation state immediately after the error-informing processing is completed. Consequently, it becomes possible to reduce the time period from when the error in the data read from the storage 33 is detected to when the error is corrected and the processor 12 returns to the ordinary operation state. Further, since the processor 12 is not shifted to the error-correction state when the error in the data read from the storage 33 is detected, the configuration of the state-control circuit is simplified and the amount of hardware (the circuit amount) is reduced.

Without being limited to the above described information processing apparatus and processor, the present invention can be applied for information processing apparatuses and processors having various configurations. For example, the present invention can be applied for anything other than a processor provided with the general-purpose register file 2 including the register window 1 illustrated in FIG. 11 and the readout circuit 3 illustrated in FIG. 12.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:
1. A processor comprising:
an accumulator that performs accumulation processing;
a storage that holds data and outputs the data to the accumulator;
an error detector that outputs a first error detection signal upon detecting an error in the data outputted from the storage;
an error identifier that outputs an error identification signal indicating that an error occurs in the storage;
an error identification signal holder that holds the error identification signal and outputs the error identification signal as a second error detection signal;

an error detection signal holder that holds the first error detection signal and outputs a cancellation signal to stop the accumulation processing of the accumulator;

a first calculator that starts making a first calculation based on the second error detection signal and the cancellation signal, and outputs a correction start signal after a lapse of a first calculation period; and an error corrector that corrects the error in the data outputted from the storage upon receiving the correction start signal.

2. The processor according to claim 1, further comprising a second calculator that starts making a second calculation based on the cancellation signal and outputs a reset signal to the error detection signal holder after a lapse of a second calculation period.

3. The processor according to claim 2, wherein the first calculator starts making the first calculation based on a logical AND result of the second error detection signal and the cancellation signal, and outputs the correction start signal based on a logical AND result of a first calculation period lapse signal indicating the lapse of the first calculation period and the second error detection signal.

4. The processor according to claim 2, wherein the correction start signal initializes the error identification signal holder.

5. The processor according to claim 2, wherein the second calculation period is longer than the first calculation period.

6. The processor according to claim 1, wherein the first calculator starts making the first calculation based on a logical AND result of the second error detection signal and the cancellation signal, and outputs the correction start signal based on a logical AND result of a first calculation period lapse signal indicating the lapse of the first calculation period and the second error detection signal.

7. The processor according to claim 1, wherein the error identification signal holder receives the correction start signal and the error identification signal holder is initialized upon receiving the correction start signal.

8. An information processing apparatus including a processor and a storage device connected to the processor, the processor comprising:

an accumulator that performs accumulation processing;

a storage that holds data received from the storage device and outputs the data to the accumulator;

an error detector that outputs a first error detection signal upon detecting an error in the data outputted from the storage;

an error identifier that outputs an error identification signal indicating that an error occurs in the storage;

an error identification signal holder that holds the error identification signal and outputs the error identification signal as a second error detection signal;

an error detection signal holder that holds the first error detection signal and outputs a cancellation signal to stop the accumulation processing of the accumulator;

a first calculator that starts making a first calculation based on the second error detection signal and the cancellation signal, and outputs a correction start signal after a lapse of a first calculation period; and an error corrector that corrects the error in the data outputted from the storage upon receiving the correction start signal.

9. A method of controlling a processor comprising:
performing accumulation processing by an accumulator;
outputting data held in a storage to the accumulator;
outputting a first error detection signal by an error detector when the error detector detects an error in the data outputted from the storage;
outputting an error identification signal indicating that an error occurs in the storage by an error identifier;
holding the error identification signal and outputting the error identification signal as a second error detection signal in an error identification signal holder;
holding the first error detection signal and outputting a cancellation signal to stop the accumulation processing of the accumulator by an error detection signal holder;
starting making a first calculation based on the second error detection signal and the cancellation signal;
outputting a correction start signal after a lapse of a first calculation period by a first calculator; and
correcting the error in the data outputted from the storage through an error corrector included in the processor when the error corrector receives the correction start signal.

10. The method of controlling the processor according to claim 9, the method further comprising starting making a second calculation based on the cancellation signal, and outputting a reset signal to the error detection signal holder after a lapse of a second calculation period by a second calculator.

11. The method of controlling the processor according to claim 9, wherein the first calculator starts making the first calculation based on a logical AND result of the second error detection signal and the cancellation signal, and outputs the correction start signal based on a logical AND result of a first calculation period lapse signal indicating the lapse of the first calculation period and the second error detection signal.

12. The method of controlling the processor according to claim 9, wherein the correction start signal initializes the error identification signal holder.

13. The method of controlling the processor according to claim 9, wherein the second calculation period is longer than the first calculation period.

14. The method of controlling the processor according to claim 9, wherein the first calculator starts making the first calculation based on a logical result AND of the second error detection signal and the cancellation signal, and outputs the correction start signal based on a logical AND result of a first calculation period lapse signal indicating the lapse of the first calculation period and the second error detection signal.

15. The method of controlling the processor according to claim 9, wherein the error identification signal holder receives the correction start signal and the error identification signal holder is initialized upon receiving the correction start signal.

* * * * *

UNITED STATES PATENT AND TRADEMARK OFFICE
CERTIFICATE OF CORRECTION

PATENT NO. : 8,448,019 B2
APPLICATION NO. : 12/971949
DATED : May 21, 2013
INVENTOR(S) : Yoshiteru Ohnuki et al.

It is certified that error appears in the above-identified patent and that said Letters Patent is hereby corrected as shown below:

In the Claims

Column 14, Line 47, In Claim 14, delete "logical result AND" and insert -- logical AND result --, therefor.

Signed and Sealed this
Twenty-seventh Day of August, 2013

Teresa Stanek Rea
*Acting Director of the United States Patent and Trademark Office*